(12) United States Patent
Miller

(10) Patent No.: US 11,376,727 B2
(45) Date of Patent: Jul. 5, 2022

(54) MULTIPLEXED ROBOTIC GAME

(71) Applicant: Kenneth C. Miller, Aptos, CA (US)

(72) Inventor: Kenneth C. Miller, Aptos, CA (US)

( * ) Notice: Subject to any disclaimer, the term of this patent is extended or adjusted under 35 U.S.C. 154(b) by 715 days.

(21) Appl. No.: 16/057,312

(22) Filed: Aug. 7, 2018

(65) Prior Publication Data
US 2019/0039236 A1 Feb. 7, 2019

Related U.S. Application Data

(60) Provisional application No. 62/541,828, filed on Aug. 7, 2017.

(51) Int. Cl.
| | |
|---|---|
| *B25J 9/00* | (2006.01) |
| *B25J 13/00* | (2006.01) |
| *A47L 5/36* | (2006.01) |
| *A47L 9/00* | (2006.01) |
| *A47L 9/28* | (2006.01) |

(52) U.S. Cl.
CPC ............ *B25J 9/0009* (2013.01); *A47L 5/362* (2013.01); *A47L 9/009* (2013.01); *A47L 9/2852* (2013.01); *B25J 9/0084* (2013.01); *B25J 13/006* (2013.01); *A47L 2201/00* (2013.01); *A47L 2201/04* (2013.01)

(58) Field of Classification Search
CPC ...... B25J 9/0009; B25J 13/006; B25J 9/0084; A47L 9/2852; A47L 5/362; A47L 9/009; A47L 2201/04; A47L 2201/00; B29C 2045/4291; G05B 2219/31008; G05B 2219/39146; G05B 2219/39163; G05B 2219/50377
See application file for complete search history.

(56) References Cited

U.S. PATENT DOCUMENTS

2018/0259962 A1* 9/2018 Junkins .................. B25J 9/1666
2020/0393865 A1* 12/2020 Parazynski ............. G05G 5/03

* cited by examiner

*Primary Examiner* — Basil T. Jos
(74) *Attorney, Agent, or Firm* — Blue Filament Law PLLC

(57) ABSTRACT

A structure for joining two or more robots to work in concert on a task is provided that includes a frame and an interface for joining the frame to the two or more robots. A remote-control device for controlling at least one robot is further provided that includes a smart device such as a smartphone, tablet, or computer, that is connected to a pedestal base via a pivot connection. A robotic system is further provided that includes a frame having a plurality of bracket arms extending from a hub, a distal end of each bracket arm having at least one of a plurality of interfaces. The robotic system also includes two or more robots each joined to the frame at at least one of the plurality of interfaces. The robotic system may further include a remote-control device, an attachment device connected to the frame, and/or an additional robot.

14 Claims, 7 Drawing Sheets

US 11,376,727 B2

MULTIPLEXED ROBOTIC GAME

RELATED APPLICATIONS

This application is a non-provisional application that claims priority benefit of U.S. Provisional Application Ser. No. 62/541,828 filed Aug. 7, 2017; the contents of which are hereby incorporated by reference.

FIELD OF THE INVENTION

The present invention in general relates to automation and robotics, and in particular to utilizing multiple robots (land or air based) working in concert/cooperation to perform tasks more efficiently and/or not possible with a single robot.

BACKGROUND OF THE INVENTION

Often it is necessary for multiple robots to function in concert/cooperation with each other to perform a particular task. The multiple robots may work together in pairs, groups, or un-connected "swarms".

While the use of multiple robots has been demonstrated, in some cases it may be beneficial for the separate robots to be physically connected together. Furthermore, there is a need for controllers that are able to work with robots with multiple functions that require more control than is possible with one control device.

Thus, there exists a need for an attachment device to connect multiple robots physically or to a single controller, as well as a group of controller devices that may work with single robots with multiple functions or multiple robots.

SUMMARY

A structure for joining two or more robots to work in concert on a task is provided that includes a frame and an interface for joining the frame to the two or more robots. A remote-control device for controlling at least one robot is further provided that includes a smart device such as a smartphone, tablet, or computer, that is connected to a pedestal base via a pivot connection. A robotic system is further provided that includes a frame having a plurality of bracket arms extending from a hub, a distal end of each bracket arm having at least one of a plurality of interfaces. The robotic system also includes two or more robots each joined to the frame at at least one of the plurality of interfaces. The robotic system may further include a remote-control device, an attachment device connected to the frame, and/or an additional robot.

DETAILED DESCRIPTION OF THE INVENTION

The present invention has utility as a structure for joining two or more robots to work in concert on a task or application. Embodiments of the invention provide a means to physically connect and control multiple robots. In inventive embodiments, smaller robots act as wheels and/or actuators for larger robotic vehicles. In a preferred embodiment omnibots may be used. An inventive frame structure of brackets is provided that may be rigid or flexible. Embodiments of the frame structure may be tubular, and in specific applications the tubes may be flexible. Embodiments of the frame may also house cables and wires that provide communication, control, and power signal to the robots joined to the frame structure. Embodiments of the frame may be adapted for stair climbing among other applications. Robots can function independently with their own sensors and communication capabilities even when joined by embodiments of the inventive frame structure. Multiple robots make up larger robots through the use of embodiments of the inventive frame. An inventive interface between the robots and the frame may illustratively provide connections for power and control signals. Embodiments of the inventive interface frame may be rigid, semi-rigid, and flexible, with a pivoting connection to each of the robots to be joined to the frame. Embodiments of the inventive frame may support extra power sources (batteries, generator, solar, etc.), a control unit for all connected robots, and storage for application specific accessories. Embodiments of the inventive frame may also have motors and or actuators which enable further functionality of the system.

Multiple control devices are provided for robots with multiple functions that require more control than is possible with one control device. Embodiments of the multiple control devices that can control a single robot with two or more smartphones, tablets, or computers. Embodiments of the controller may use internal magnetometer(s), gyro(s), and accelerometer(s). The individual control devices may be controlled with hands and/or feet. In a specific inventive embodiment, the control devices may be mounted to spherical pivot stand(s), with a spring return to center/level position in the manner of a joystick. Multiple people may operate single or multiple devices controlling a single robot.

Figure 1A:
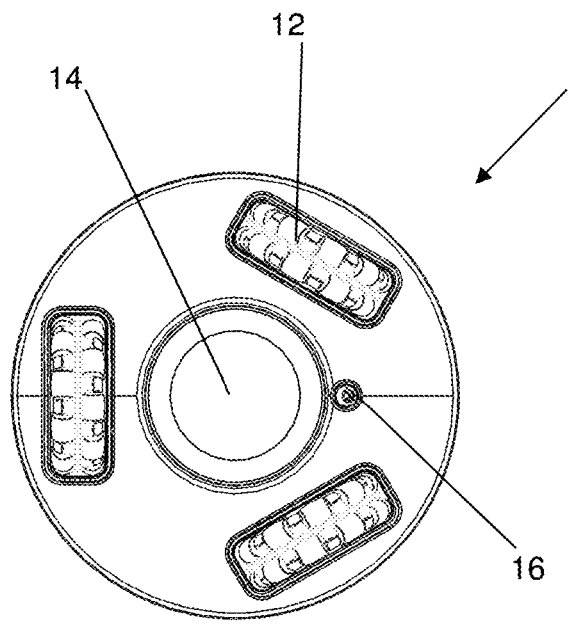
FIGS. 1A-1C are a series of perspective views of a robot that can be joined in a group or cluster in accordance with embodiments of the invention.
Figure 1B:
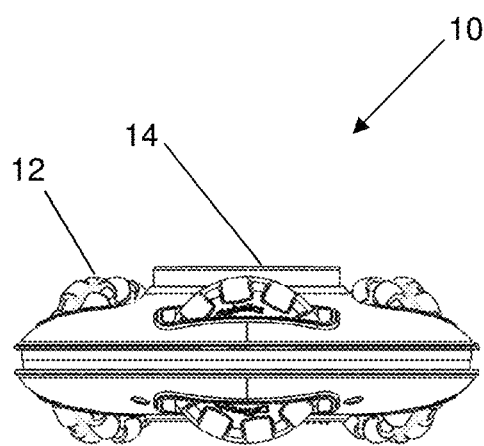
Figure 1C:
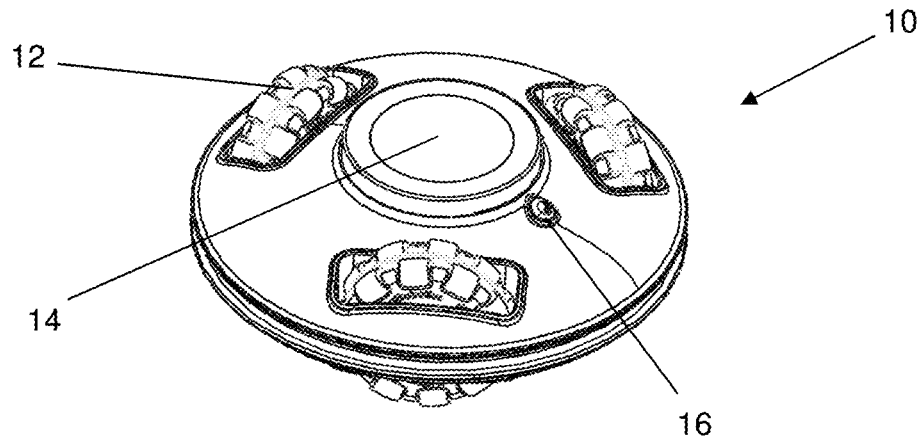
Figure 2A:
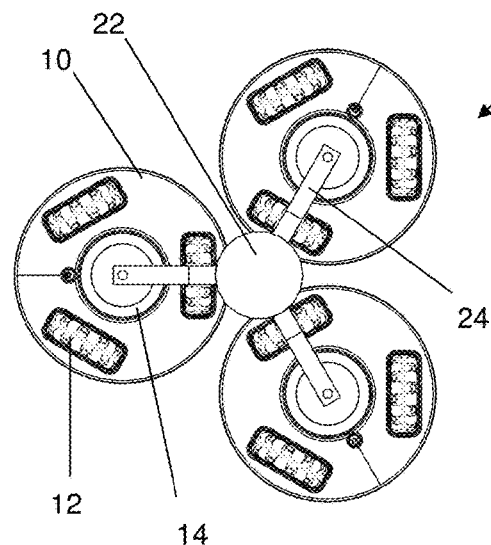
FIGS. 2A and 2B are a top view and a perspective view, respectively, of a group or cluster of robots joined with a bracket in accordance with embodiments of the invention.
Figure 2B:
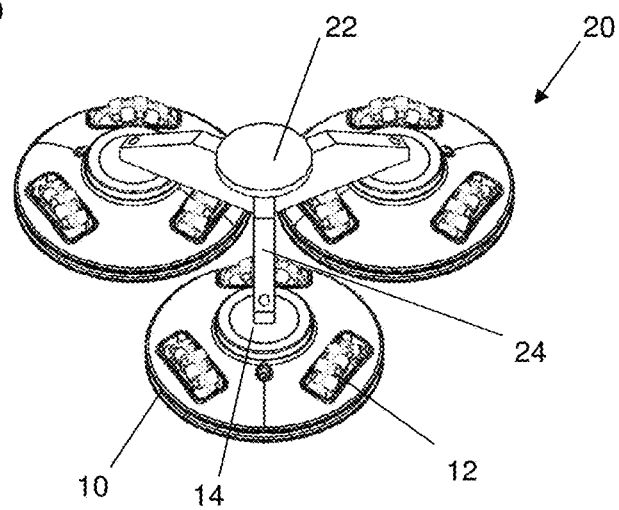
Figure 3:
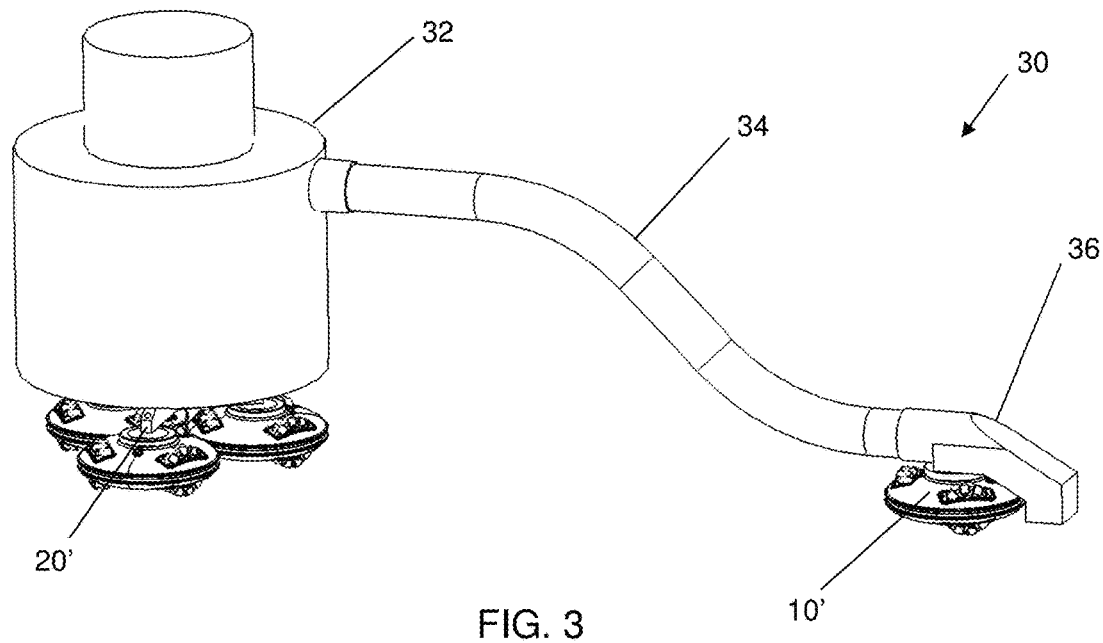
FIG. 3 is a perspective view of a vacuum mounted on a cluster of robots according to embodiments of the invention.
Figure 4:
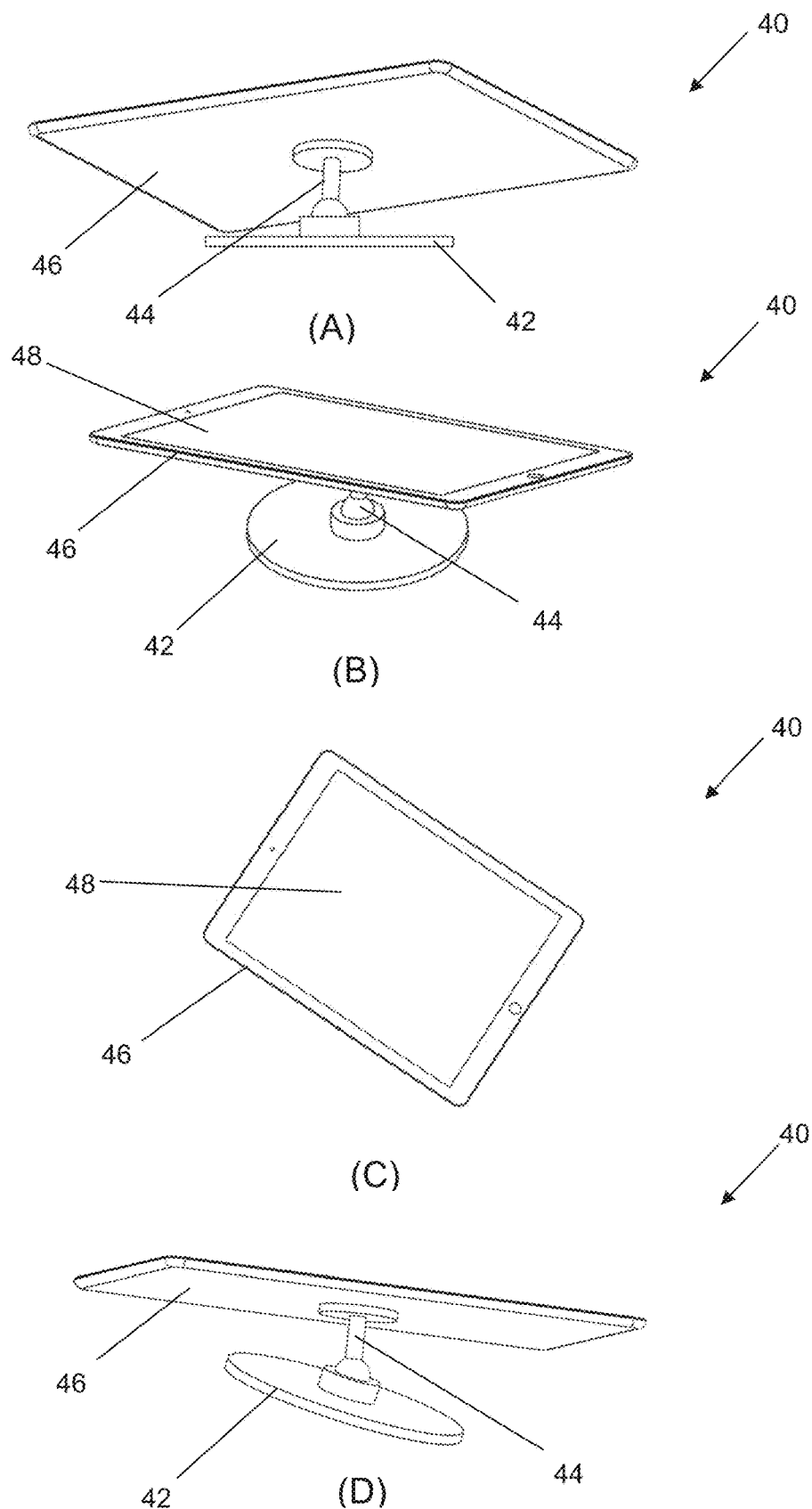
FIGS. 4A-4D are a series of perspective views of a remote-control device according to embodiments of the invention.

Referring now to the figures, FIGS. 1A-1C are a series of perspective views of an embodiment of an inventive robot 10 that can be joined in a group or cluster. The robot 10 has a plurality of wheels 12 to control the movement of the robot 10. The robot 10 may also have a coupling or connection point 14 that serves as an interface to the frame 22 of FIGS. 2A and 2B. FIGS. 2A and 2B are a top view and a perspective view, respectively, of a group or cluster 20 of individual robots 10 joined with a frame 22 with bracket arms 24. FIG. 3 is a perspective view of an application 30 of a vacuum canister 32 mounted on a cluster 20' of robots 10, with a vacuum hose 34 extending from the vacuum canister 32. A nozzle 36 at the distal end of the vacuum hose 34 is mounted to a single robot 10'. The motion of the vacuum hose 34 and nozzle 36 may be independently controlled with the single robot 10', while the motion of the vacuum canister 32 is controlled by the cluster 20' of connected robots.

FIGS. 4A-4D are a series of perspective views of a remote-control device 40. The embodiment shown is of a remote-control device 40 in the form of a tablet or communication device 46 illustratively including a cell phone that is attached to a base 42 via a pivot connection 44 mounted to the rear of the tablet or communication device 46. An operator physically rotates and pivots the tablet or communication device 46 to provide commands to the robot(s) being controlled. The movements measured by the internal magnetometer(s), gyro(s), and accelerometer(s) within the tablet or communication devices 46 are translated to the robot(s) being controlled. Visual feedback including from cameras 16 mounted on the robot 10 may be provided on display 48 of the tablet or communication device 46.

Figure 5A:
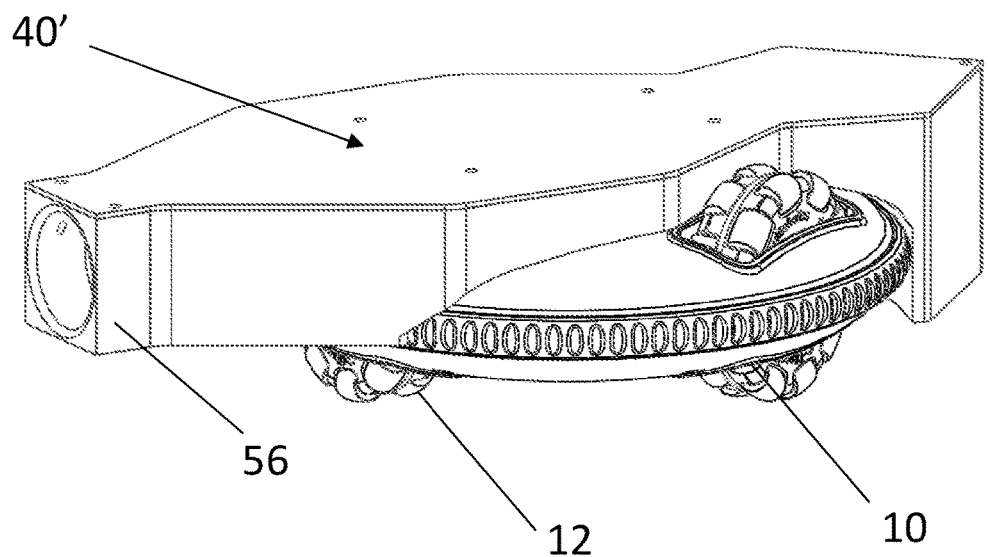
FIGS. 5A-5C are view of a low profile vacuum nozzle embodiment in perspective (FIG. 5A), side view (FIG. 5B), bottom view with a cover removed (FIG. 5C)
Figure 5B:
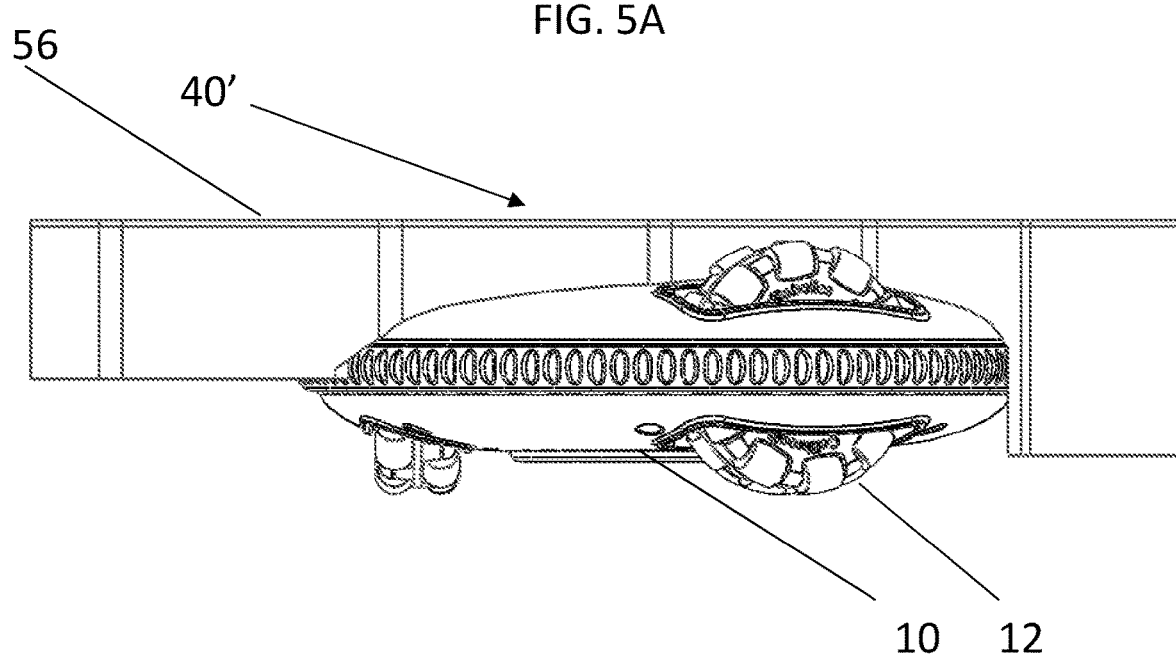
Figure 5C:
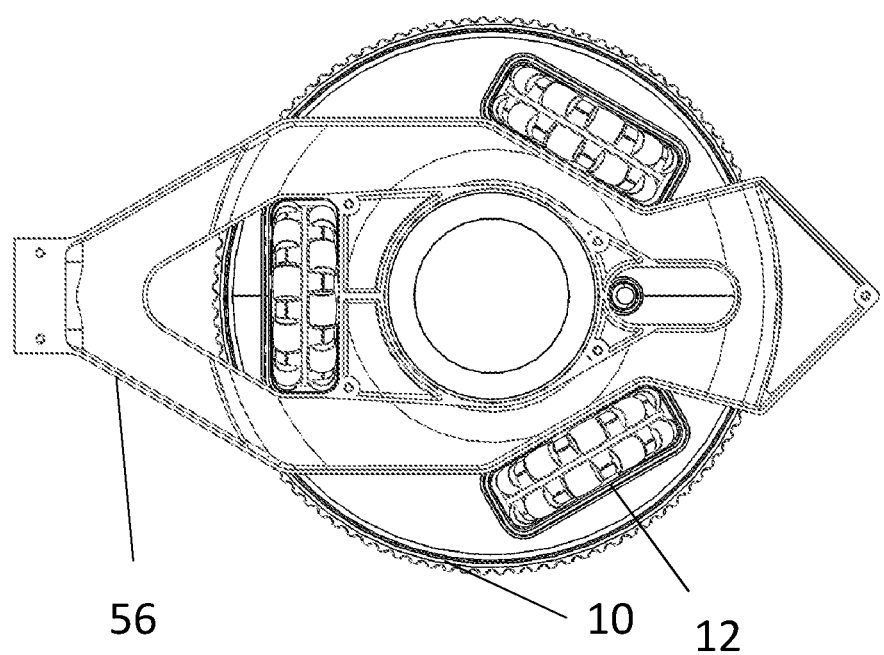

FIGS. 5A-5C are a series of views of a remote-control device 40' in which like reference numerals have the aforementioned meanings associated therewith. The embodiment shown is of a remote-control device 40' is a low profile vacuum nozzle 56. The movements measured by the internal magnetometer(s), gyro(s), and accelerometer(s) within the tablet or communication devices 46 are translated to the robot being controlled as detailed above. Visual feedback including from cameras 16 mounted on the robot 10 may be provided on display 48 of the tablet or communication device 46.

Figure 6A:
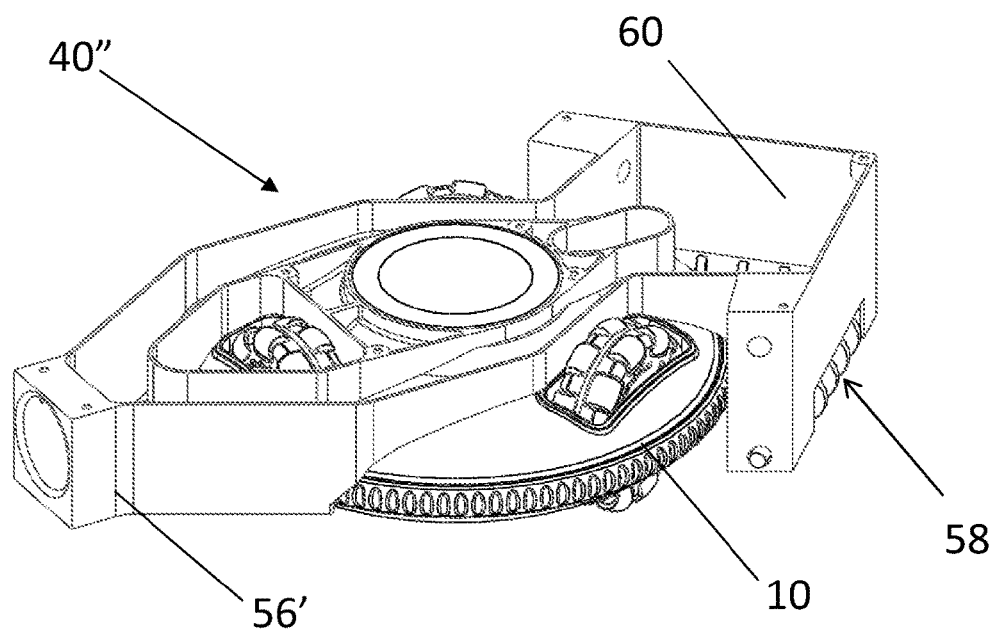
FIGS. 6A-6C are view of a vacuum nozzle embodiment with motorized brushes in perspective (FIG. 6A), side view (FIG. 6B), bottom view with a cover removed (FIG. 6C).
Figure 6B:
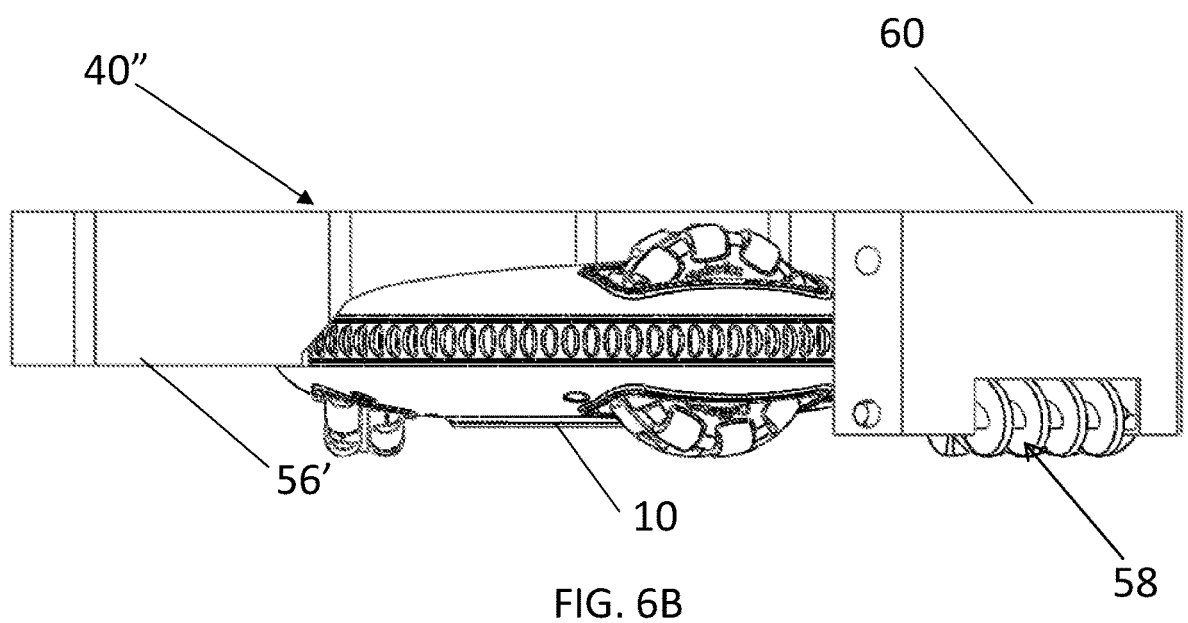
Figure 6C:
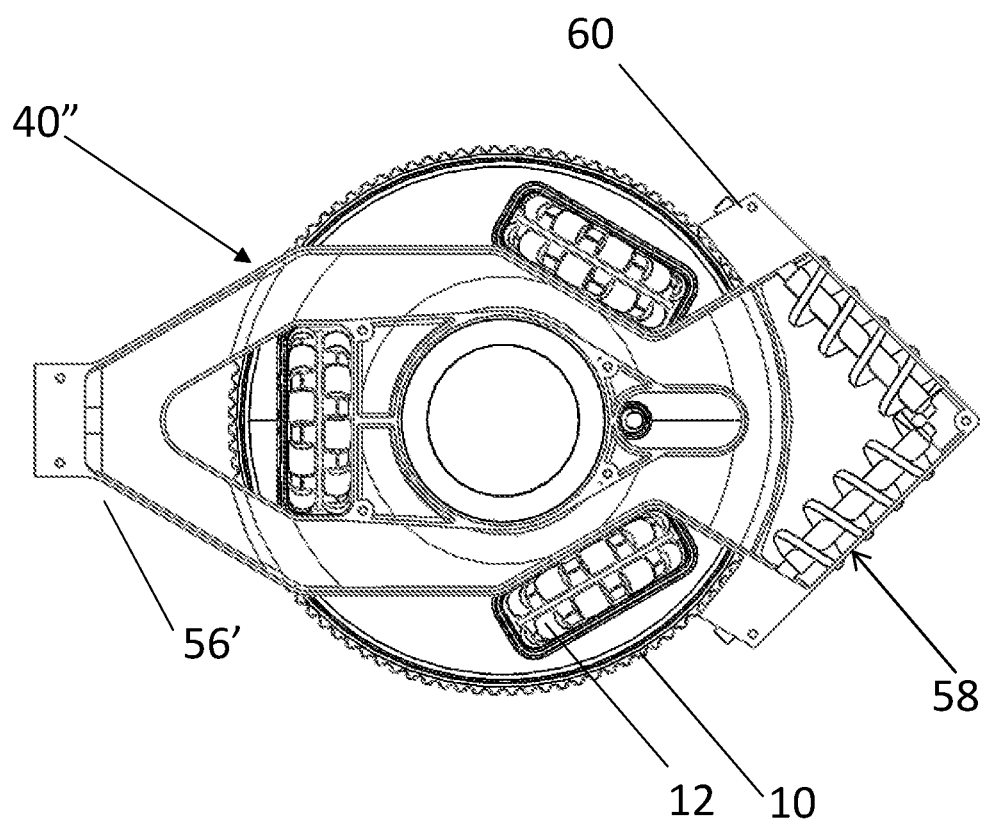

FIGS. 6A-6C are a series of views of a remote-control device 40" in which like reference numerals have the aforementioned meanings associated therewith. The embodiment shown is of a remote-control device 40" is a low profile vacuum nozzle 56' with mechanical motorized brushes 58 rotating relative to a housing 60. The movements measured by the internal magnetometer(s), gyro(s), and accelerometer(s) within the tablet or communication devices 46 are translated to the robot being controlled as detailed above. Visual feedback including from cameras 16 mounted on the robot 10 may be provided on display 48 of the tablet or communication device 46.

Each of the aforementioned components, sensors, electronics, etc. used in the robotic clusters may be individual modules that plug into a power bus and communicate via the Internet, bluetooth, WiFi, wire, or a combination thereof to embodiments of the control devices (PC, tablet, phone, etc.), or they could all be part of one complete assembly that is self-powered or connects to the power bus and communicates via the Internet, bluetooth, WiFi, wire, etc. to a control device (PC, tablet, phone, etc.).

Any patents or publications mentioned in this specification are herein incorporated by reference to the same extent as if each individual publication was specifically and individually indicated to be incorporated by reference.

The foregoing description is illustrative of particular embodiments of the invention but is not meant to be a limitation upon the practice thereof.

The invention claimed is:

1. A structure for joining two or more robots to work in concert on a task, said structure comprising:
    a frame having a plurality of bracket arms extending from a hub, a distal end of each bracket arm having at least one of a plurality of interfaces, each of said interfaces for joining said frame to one robot of the two or more robots;
    an attachment device connected to the hub of said frame; and
    at least one additional robot connected to said attachment device, said at least one additional robot being separate from said frame.

2. The structure of claim 1 further comprising at least one wire or cable housed by said frame.

3. The structure of claim 2 wherein the at least one wire or cable is configured to provide at least one of communication, control, or power signal to the two or more robots joined to said frame.

4. The structure of claim 1 further comprising a vacuum canister supported on said frame with a nozzle 36 at a distal end of a vacuum hose mounted to, said at least one additional robot.

5. The structure of claim 1 wherein said interface provides connection for power and control signals to the two or more robots.

6. The structure of claim 1 wherein said interface is configured to pivotally connect to the two are more robots.

7. The structure of claim 1 wherein said frame supports a power source for powering the two or more robots.

8. A robotic system comprising:
    one or more robots support a vacuum canister thereon;
    a vacuum hose extending from said vacuum canister and terminating in a nozzle; and
    at least one additional robot supporting said nozzle and adapted to be independently movable relative to said one or more robots.

9. A remote-control device for control of at least one robot of a robotic system of claim 8, said remote control comprising:
    at least one of a smartphone, tablet, or computer; and
    a pedestal base connected to said at least one of a smartphone, tablet, or computer, via a pivot connection.

10. The remote-control device of claim 9 wherein the pivot connection of said pedestal base is spring biased to return to a center position.

11. The remote-control device of claim 9 wherein said pedestal base operates as a joystick.

12. The remote-control device of claim 9 wherein physical movement of said at least one smartphone, tablet, or computer on said pedestal base provides operation commands to the at least one robot being controlled by said remote-control device.

13. The remote-control device of claim 9 further comprising multiple remote-control devices for control of one robot with multiple functions.

14. The robotic system of claim 8 further comprising remote-control device for controlling said two or more robots.

* * * * *